US012658128B2

(12) United States Patent
Li et al.

(10) Patent No.: US 12,658,128 B2
(45) Date of Patent: Jun. 16, 2026

(54) DISPLAY PANEL AND DISPLAY DEVICE

(71) Applicant: Xiamen Tianma Display Technology Co., Ltd., Xiamen (CN)

(72) Inventors: Xiangyuan Li, Xiamen (CN); Chengxu Li, Xiamen (CN); Jingzhu Li, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/805,936

(22) Filed: Aug. 15, 2024

(65) Prior Publication Data

US 2024/0404474 A1 Dec. 5, 2024

(30) Foreign Application Priority Data

Aug. 30, 2023 (CN) ......................... 202311108738.5

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/0233* (2013.01)

(58) Field of Classification Search
None
See application file for complete search history.

(56) References Cited

U.S. PATENT DOCUMENTS

| | | | | | |
|---|---|---|---|---|---|
| 12,205,543 | B2 * | 1/2025 | Xie | G09G 3/3233 | |
| 2021/0104196 | A1 * | 4/2021 | Yuan | G09G 3/3258 | |
| 2021/0150985 | A1 * | 5/2021 | Li | G09G 3/2003 | |
| 2021/0383743 | A1 * | 12/2021 | Yuan | G09G 3/32 | |
| 2021/0407384 | A1 * | 12/2021 | Yuan | G09G 3/32 | |
| 2022/0335872 | A1 * | 10/2022 | Zhang | G09G 3/3233 | |
| 2022/0358883 | A1 * | 11/2022 | Li | G09G 3/3266 | |
| 2023/0045192 | A1 * | 2/2023 | Zhang | G09G 3/32 | |
| 2023/0070413 | A1 * | 3/2023 | Xu | H10D 30/6755 | |
| 2023/0108303 | A1 * | 4/2023 | Xie | G09G 3/3233 | 345/690 |
| 2023/0116780 | A1 * | 4/2023 | Zhang | G09G 3/3233 | 345/691 |

(Continued)

FOREIGN PATENT DOCUMENTS

CN 112150967 A 12/2020

*Primary Examiner* — Dorothy Harris
(74) *Attorney, Agent, or Firm* — KDW FIRM PLLC

(57) ABSTRACT

Provided are a display panel and a display device. The display panel includes a pixel circuit and a light-emitting element. The pixel circuit includes a drive module and a bias adjustment module. The drive module is configured to provide a drive current to the light-emitting element, and includes a drive transistor. The bias adjustment module is connected between a first terminal of the drive transistor and a bias signal terminal, a control terminal of the bias adjustment module is connected to a first scan signal terminal, and a second terminal of the drive transistor is coupled to the light-emitting element. A working process of the pixel circuit includes a pre-stage, the pre-stage includes a bias adjustment stage, the bias adjustment module is turned on in the bias adjustment stage, and the bias signal terminal provides a bias signal to the first terminal of the drive transistor.

18 Claims, 8 Drawing Sheets

(56) References Cited

U.S. PATENT DOCUMENTS

| | | | | |
|---|---|---|---|---|
| 2023/0178008 | A1* | 6/2023 | Yuan | G09G 3/3233 345/55 |
| 2023/0222968 | A1* | 7/2023 | Li | H10D 86/60 345/204 |
| 2024/0078972 | A1* | 3/2024 | Zhang | G09G 3/3233 |

* cited by examiner

DISPLAY PANEL AND DISPLAY DEVICE

This application claims priority to Chinese Patent Application No. 202311108738.5 filed Aug. 30, 2023, the disclosure of which is incorporated herein by reference in its entirety.

TECHNICAL FIELD

The present disclosure relates to the field of display technologies, and in particular to a display panel and a display device.

BACKGROUND

In the display panel, the pixel circuit provides a drive current required for display to a light-emitting element of the display panel, and controls whether the light-emitting element enters the light-emitting stage.

However, as the use time increases, the internal characteristics of a drive transistor in the pixel circuit change slowly, so that the threshold voltage of the drive transistor is shifted, thereby affecting the overall characteristics of the drive transistor and further affecting the display uniformity.

SUMMARY

The present disclosure provides a display panel and a display device so as to improve the display effect.

According to an aspect of the present disclosure, a display panel is provided. The display panel includes a pixel circuit and a light-emitting element. The pixel circuit includes a drive module and a bias adjustment module. The drive module is configured to provide a drive current to the light-emitting element and includes a drive transistor. The bias adjustment module is connected between a first terminal of the drive transistor and a bias signal terminal, a control terminal of the bias adjustment module is connected to a first scan signal terminal, and a second terminal of the drive transistor is coupled to the light-emitting element. A working process of the pixel circuit includes a pre-stage, the pre-stage includes a bias adjustment stage, the bias adjustment module is turned on in the bias adjustment stage, and the bias signal terminal provides a bias signal to the first terminal of the drive transistor.

According to another aspect of the present disclosure, a display device is provided. The display device includes the display panel described above.

BRIEF DESCRIPTION OF DRAWINGS

In order to describe technical schemes in embodiments of the present disclosure more clearly, the drawings used for describing the embodiments will be briefly introduced below. The drawings in the following description are merely some embodiments of the present disclosure. For those of ordinary skill in the art, other drawings may also be obtained without creative labor according to these drawings.

DETAILED DESCRIPTION

In order that those skilled in the art will better understand the schemes of the present disclosure, the technical solutions adopted, and the technical effects to be achieved by the present disclosure, the technical schemes of embodiments of the present disclosure will be clearly and completely described below in conjunction with the accompanying drawings of the embodiments of the present disclosure. Apparently, the described embodiments are merely some embodiments of the present disclosure, rather than all of the embodiments. All other embodiments obtained by those of ordinary skill in the art based on the embodiments of the present disclosure without needing creative efforts shall all fall in the scope of protection of the present disclosure.

It should be noted that the terms “first”, “second” and the like in the Description and claims of the present disclosure, and in the foregoing drawings, are used for distinguishing between similar objects and not necessarily for describing a particular order or sequential order. It should be understood that the data so used are interchangeable as appropriate so that embodiments of the present disclosure described herein can be implemented in an order other than those illustrated or described herein. Moreover, the terms “include” and “have” as well as any variations thereof, are intended to cover a non-exclusive inclusion, for example, a process, a method, a system, a product, or a device that includes a series of steps or units is not necessarily limited to those steps or units expressly listed, but may include other steps or units not expressly listed or inherent to such process, method, product, or device.

Figure 1:
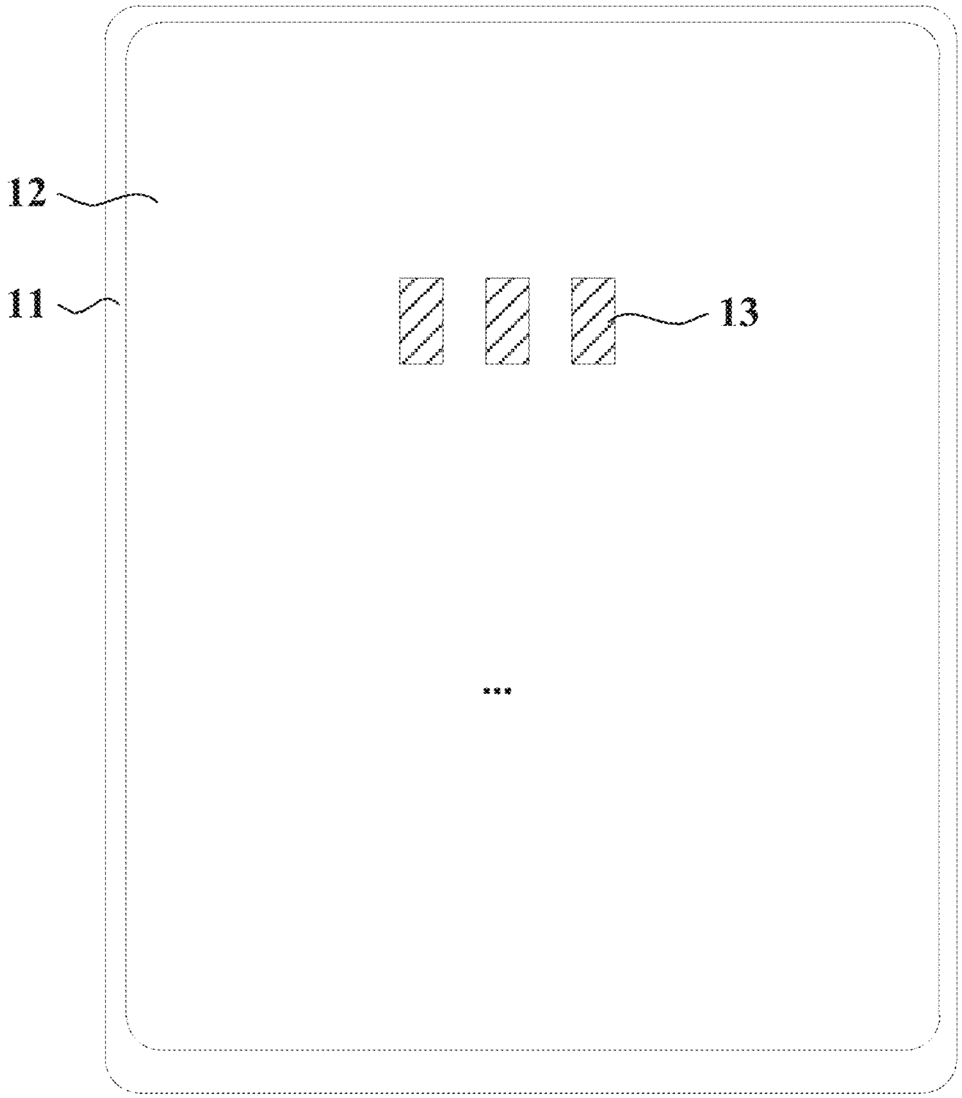
FIG. 1 is a schematic diagram of a display panel according to an embodiment of the present disclosure.

FIG. 1 is a schematic diagram of a display panel according to an embodiment of the present disclosure. As shown in FIG. 1, the display panel in this embodiment includes a non-display region 11 and a display region 12. The display region 12 includes multiple sub-pixels 13. A peripheral driver circuit (not shown) and other structures are disposed in the non-display region 11. The peripheral driver circuit and other structures in the non-display region 11 are configured to drive a sub-pixel 13 of the display region 12 for display. The sub-pixel 13 includes a light-emitting element and a pixel circuit which are electrically connected. The peripheral driver circuit and other structures in the non-display region 11 are connected to the pixel circuit, and the pixel circuit is controlled to drive the light-emitting element to emit light.

Figure 2:
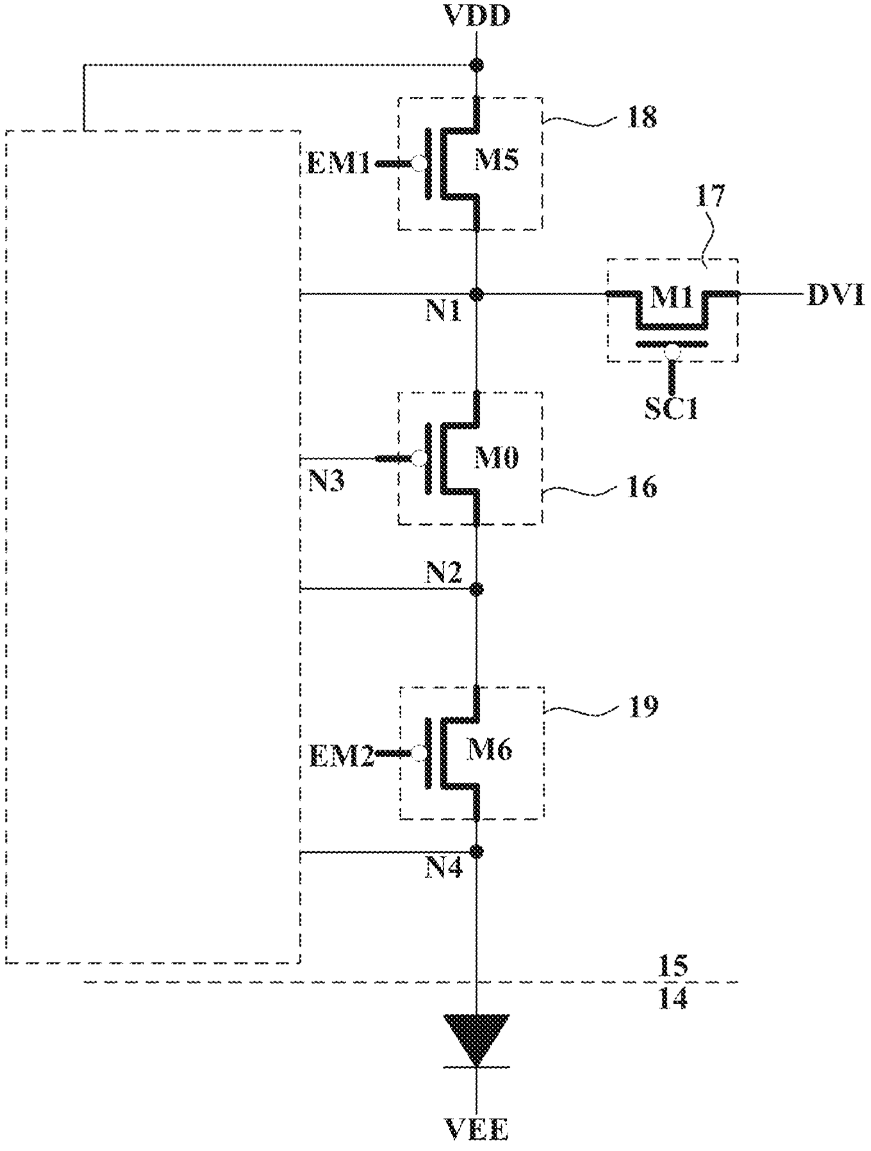
FIG. 2 is a schematic diagram of a pixel circuit according to an embodiment of the present disclosure.

FIG. 2 is a schematic diagram of a pixel circuit according to an embodiment of the present disclosure. As shown in FIG. 2, the display panel in this embodiment includes a light-emitting element 14 and a pixel circuit 15. The pixel circuit 15 includes a drive module 16 and a bias adjustment module 17. The drive module 16 is configured to provide a drive current to the light-emitting element 14 and includes a drive transistor M0. The bias adjustment module 17 is connected between a first terminal N1 of the drive transistor M0 and a bias signal terminal DVI, a control terminal of the bias adjustment module 17 is connected to a first scan signal terminal SC1, and a second terminal N2 of the drive transistor M0 is coupled to the light-emitting element 14. A working process of the pixel circuit 15 includes a pre-stage, the pre-stage includes a bias adjustment stage, the bias adjustment module 17 is turned on in the bias adjustment stage, and the bias signal terminal DVI provides a bias signal to the first terminal N1 of the drive transistor M0.

It should be noted that FIGS. 1 and 2 only schematically shows the key structures in the above-described embodiments and do not encompass all structures in which the circuit operates, and that other partial circuit structures are gradually shown in the following along with the description of this embodiment.

In this embodiment, the pixel circuit 15 includes a drive module 16. The drive module 16 includes a drive transistor M0, and the drive transistor includes a gate N3, a first terminal N1 and a second terminal N2. The first terminal N1 of the drive transistor M0 is connected to an output terminal of the bias adjustment module 17, and moreover, the first terminal N1 of the drive transistor M0 is coupled to a first power supply signal terminal VDD. The second terminal N2 of the drive transistor M0 is coupled to a first electrode (node N4) of the light-emitting element 14. The first power supply signal terminal VDD provides a stable voltage signal. When a gate N3 of the drive transistor M0 receives an effective pulse signal, the drive transistor M0 is turned on, and the drive transistor M0 provides the drive current to the light-emitting element 14 according to the voltage signal provided by the first power supply signal terminal VDD. When the gate N3 of the drive transistor M0 receives an ineffective pulse signal, the drive transistor M0 is turned off.

In an embodiment, the drive transistor M0 is a P-type transistor, the first terminal N1 of the drive transistor M0 is a source and is connected to the output terminal of the bias adjustment module 17, and the second terminal N2 of the drive transistor M0 is a drain and is coupled to the first electrode N4 of the light-emitting element 14. Based on this, the effective pulse signal received by the gate N3 of the drive transistor M0 is a low voltage to enable the drive transistor M0 to be turned on, and the ineffective pulse signal received by the gate N3 of the drive transistor M0 is a high voltage to enable the drive transistor M0 to be turned off. It should be appreciated that the source and the drain of the transistor are not constant, but will change as the drive state of the transistor changes. In other embodiments, the drive transistor is an N-type transistor, and the first terminal (N1) of the drive transistor is a drain and is connected to the output terminal of the bias adjustment module, and the second terminal (N2) of the drive transistor is a source and is coupled to the light-emitting element.

The pixel circuit 15 includes a bias adjustment module 17, an input terminal of the bias adjustment module 17 is connected to the bias signal terminal DVI, an output terminal of the bias adjustment module 17 is connected to the first terminal N1 of the drive transistor M0, a control terminal of the bias adjustment module 17 is connected to a first scan signal terminal SC1, and the bias adjustment module 17 is configured to perform the bias adjustment on the drive transistor M0. The bias signal terminal DVI provides a bias signal, and the first scan signal terminal SC1 provides voltage signals alternating between high and low levels. When the first scan signal terminal SC1 provides the effective pulse signal to the control terminal of the bias adjustment module 17, the bias adjustment module 17 is turned on, and the bias signal provided by the bias signal terminal DVI is written into the first terminal N1 of the drive transistor M0. In the bias adjustment stage, when the drive transistor M0 is turned on, the bias signal provided by the bias signal terminal DVI is sequentially written into the first terminal N1 and the second terminal N2 of the drive transistor M0. When the first scan signal terminal SC1 provides the ineffective pulse signal to the control terminal of the bias adjustment module 17, the bias adjustment module 17 is turned off. When the bias adjustment module 17 is turned on, if the bias signal provided by the bias signal terminal DVI is a low voltage, then the low voltage of the bias signal will pull down the potentials of the first terminal N1 and the second terminal N2 of the drive transistor M0. If the bias signal provided by the bias signal terminal DVI is a high voltage, then the high voltage of the bias signal pulls up the potentials of the first terminal N1 and the second terminal N2 of the drive transistor M0.

In an embodiment, the pixel circuit 15 includes a first dimming module 18 and a second dimming module 19. The first dimming module 18 is connected between the first power supply signal terminal VDD and the first terminal N1 of the drive transistor M0, and a control terminal of the first dimming module 18 is connected to the first dimming control terminal EM1. The second dimming module 19 is connected between the second terminal N2 of the drive transistor M0 and the light-emitting element 14, and a control terminal of the second dimming module 19 is connected to the second dimming control terminal EM2. In the pre-stage, the first dimming module 18 and the second dimming module 19 are turned off. Specifically, the second dimming module 19 is connected between the second terminal N2 of the drive transistor M0 and the first electrode N4 of the light-emitting element 14, and a second electrode of the light-emitting element 14 is connected to the second power supply signal terminal VEE. By controlling the on/off states of the first dimming module 18 and the second dimming module 19, a light-emitting duration of the light-emitting element 14 may be adjusted to control the magnitude of the drive current supplied to the light-emitting element 14. The first dimming control terminal EM1 provides voltage signals alternating between high and low levels, and the second dimming control terminal EM2 provides voltage signals alternating between high and low levels.

When the first dimming control terminal EM1 provides the ineffective pulse signal to the control terminal of the first dimming module 18, and the second dimming control terminal EM2 provides the ineffective pulse signal to the control terminal of the second dimming module 19, both the first dimming module 18 and the second dimming module 19 are turned off, and the pixel circuit 15 enters the pre-set stage, that is, a non-light-emitting stage, and at this time, the drive current does not flow into the light-emitting element 14. When the first dimming control terminal EM1 provides the effective pulse signal to the control terminal of the first dimming module 18, and the second dimming control terminal EM2 provides the effective pulse signal to the control terminal of the second dimming module 19, both the first dimming module 18 and the second dimming module 19 are turned on, the pixel circuit 15 enters the light-emitting stage, the drive transistor M0 is turned on so that the drive current flows into the light-emitting element 14, and the duration of the light-emitting stage of the pixel circuit 15 is the light-emitting duration of the light-emitting element 14.

In an embodiment, the first electrode N4 of the light-emitting element 14 is an anode, and the second electrode of the light-emitting element 14 is a cathode. The voltage signal provided by the first power supply signal terminal VDD is greater than the voltage signal provided by the second power supply signal terminal VEE, but is not limited thereto. In other embodiments, the magnitude of the voltage signals provided by the first power signal terminal and the second power signal terminal can be reasonably designed according to the structural change of the pixel circuit, or the first electrode of the light-emitting element is designed to be a cathode and the second electrode is designed to be an anode, which is not specifically illustrated and shown.

Figure 3:
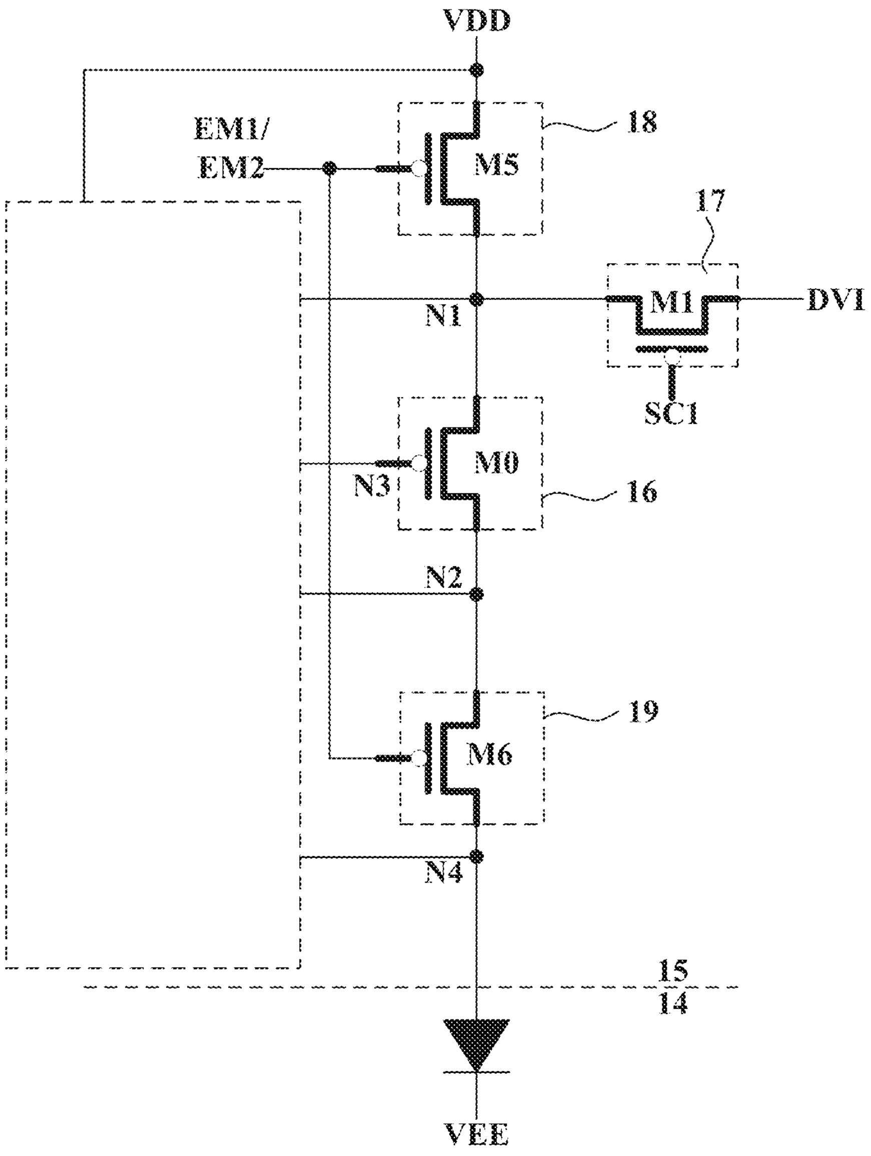
FIG. 3 is a schematic diagram of another pixel circuit according to an embodiment of the present disclosure.

FIG. 3 is a schematic diagram of another pixel circuit according to an embodiment of the present disclosure. As shown in FIG. 3, the first dimming control terminal EM1 is also served as the second dimming control terminal EM2. Based on this, when the first dimming control terminal EM1 provides the ineffective pulse signal, the first dimming module 18 and the second dimming module 19 are simultaneously turned off; when the first dimming control terminal EM1 provides the effective pulse signal, the first dimming module 18 and the second dimming module 19 are simultaneously turned on. A duty ratio of the on/off states of the first dimming module 18 and the second dimming module 19 is adjusted, so that the light-emitting duration of the light-emitting element 14 is changed to achieve the dimming of the pixel circuit 15.

The signal provided by the first dimming control terminal EM1 and the signal provided by the second dimming control terminal EM2 may be the same or different. Those skilled in the art may, according to the requirements of the product, reasonably design that the first dimming control terminal and the second dimming control terminal in the pixel circuit are connected to two different dimming control signal lines (as shown in FIG. 2), or the first dimming control terminal and the second dimming control terminal in the pixel circuit are connected to the same dimming control signal line (as shown in FIG. 3), which is not specifically limited.

The following embodiments will be described in detail by using the pixel circuit shown in FIG. 3 as an example.

The working process of the pixel circuit 15 includes a pre-stage and a light-emitting stage. Specifically, the first dimming control terminal EM1 provides the ineffective pulse signal to the control terminal of the first dimming module 18 so that both the first dimming module 18 and the second dimming module 19 are turned off, and the pixel circuit 15 enters the pre-stage. The first dimming control terminal EM1 provides the effective pulse signal to the control terminal of the first dimming module 18 so that both the first dimming module 18 and the second dimming module 19 are turned on, whereby the pixel circuit 15 enters the light-emitting stage, and the drive transistor M0 is turned on to enable the drive current to flow into the light-emitting element 14.

The pre-stage includes a bias adjustment stage, the bias adjustment module 17 is turned on in the bias adjustment stage, and the bias signal terminal DVI provides a bias signal to the first terminal N1 of the drive transistor M0. Specifically, the first scan signal terminal SC1 provides the effective pulse signal to the control terminal of the bias adjustment module 17 during part of a time period of the pre-stage so that the bias adjustment module 17 is turned on, the pixel circuit 15 enters the bias adjustment stage, and the bias signal provided by the bias signal terminal DVI is written into the first terminal N1 of the drive transistor M0. In remaining part of the time period except the bias adjustment stage, the first scan signal terminal SC1 provides the ineffective pulse signal to the control terminal of the bias adjustment module 17 to enable the bias adjustment module 17 to be turned off.

As shown in FIG. 3, for a drive transistor M0 of a PMOS type, the drive transistor M0 is turned on when the pixel circuit 15 enters the light-emitting stage, and at this time, the drive transistor M0 is in a state in which a potential Vg of the gate (N3) is less than a potential of the source (N1), while the drive transistor M0 is also worked in an unsaturated state, in the unsaturated state, a voltage of a drain (N2) of the drive transistor M0 tends to be less than a voltage of a gate (N3) of the drive transistor M0, which may cause the pixel circuit 15 to generate a phenomenon that the drive transistor M0 is turned on but the voltage of the drain (N2) is less than the voltage of the gate (N3) during the light-emitting stage, and a voltage difference between the voltage of the drain and the voltage of the gate is larger and a potential difference is larger.

Similarly, for a drive transistor of an NMOS type, when the pixel circuit enters the light-emitting stage, the drive transistor is turned on, that is, the drive transistor is in a state in which a potential of a gate (N3) of the drive transistor is greater than a potential of a source (N2) of the drive transistor, and at this time, the voltage of the drain (N1) is VDD, which may cause the pixel circuit to generate a phenomenon that the drive transistor of the NMOS type is turned on but the voltage of the drain is greater than the voltage of the gate (N3) during the light-emitting stage, and a voltage difference between the voltage of the drain and the voltage of the gate is larger and a potential difference is larger With such a long-term arrangement, the ions inside the drive transistor M0 are polarized, and further a built-in electric field is formed in the drive transistor M0, so that a threshold voltage of the drive transistor M0 is increased continuously.

Figure 4:
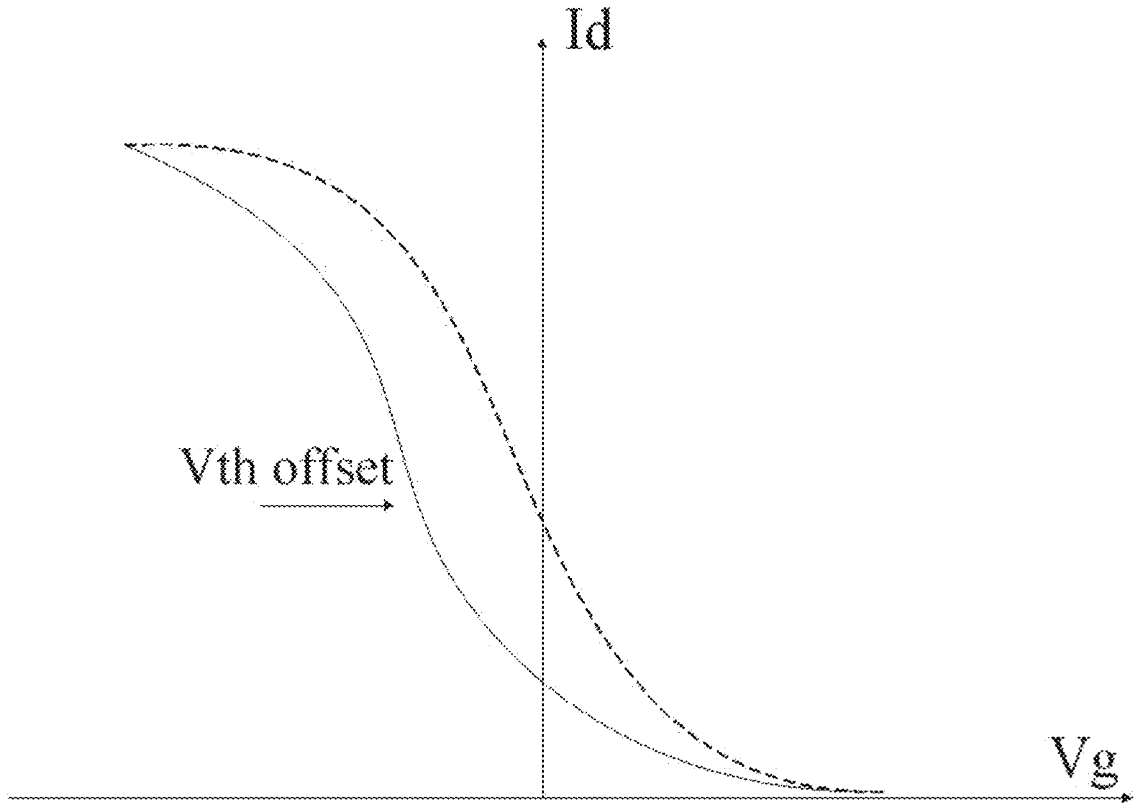
FIG. 4 is a schematic diagram of a drift of an Id-Vg curve of a drive transistor.

FIG. 4 is a schematic diagram of a drift of an Id-Vg curve of a drive transistor. As shown in FIG. 4, the abscissa Vg is a voltage of the gate of the drive transistor, the ordinate Id is a current of the drain of the drive transistor, the Id-Vg curve of the drive transistor is offset, and the threshold voltage of the drive transistor is changed, so that the magnitude of the drive current flowing into the light-emitting element is affected, thereby affecting the display uniformity.

In this embodiment, the pixel circuit 15 includes a bias adjustment module 17, and the bias adjustment module 17 is provided so that a problem caused by the hysteresis characteristic of the drive transistor M0 is improved. In the part of the time period of the pre-stage, the first scan signal terminal SC1 provides the effective pulse signal to the control terminal of the bias adjustment module 17 to enable the bias adjustment module 17 to be turned on, the pixel circuit 15 enters the bias adjustment stage to enable the drive transistor M0 to be turned on, the bias signal provided by the bias signal terminal DVI is written into the first terminal N1 of the drive transistor M0 and the second terminal N2 of the drive transistor M0, so that the potential of the drain of the drive transistor M0 may be adjusted to reduce a potential difference between the drain of the drive transistor M0 and the gate N3 of the drive transistor M0, thereby achieving the voltage bias between the gate N3 of the drive transistor M0 and the drain of the drive transistor M0, reducing the degree of the polarization of ions inside the drive transistor M0, further weakening the offset degree of the threshold voltage of the drive transistor M0, improving the offset phenomenon and the hysteresis effect of the threshold voltage of the drive transistor M0, improving the brightness difference of each frame of picture at a low frequency and thus improving the display uniformity.

As shown in FIG. 3, the drive transistor M0 is a P-type transistor, and the bias signal provided by the bias signal terminal DVI during the bias adjustment stage is a high-level signal. In the bias adjustment stage, both the bias adjustment module 17 and the drive transistor M0 are turned on, and the high voltage signal provided by the bias signal terminal DVI is written into the second terminal N2 of the drive transistor M0 via the first terminal N1 of the drive transistor M0, so that the potential of the drain (N2) of the drive transistor M0 can be increased, a potential difference between a potential of the gate (N3) of the drive transistor M0 and a potential of the drain (N2) of the drive transistor M0 can be reduced, and the voltage bias between the gate of the drive transistor M0 and the drain of the drive transistor M0 can be achieved.

In other embodiments, optionally, the drive transistor is an N-type transistor and the bias signal provided at the bias signal terminal during the bias adjustment stage is a low level signal. In the bias adjustment stage, the bias adjustment module is turned on, and the low voltage signal provided by the bias signal terminal is written into the first terminal N1 of the drive transistor via the bias adjustment module, so that the potential of the drain (N1) of the drive transistor can be reduced, a potential difference between the potential of the gate of the drive transistor and the potential of the drain of the drive transistor can be reduced, and the voltage bias between the gate of the drive transistor and the drain of the drive transistor can be achieved.

In the present disclosure, the working process of the pixel circuit includes the pre-stage, and the part of the time period of the pre-stage is used as the bias adjustment stage. In the bias adjustment stage, the bias adjustment module is turned on, and a bias signal provided by the bias signal terminal is written into the first terminal of the drive transistor and the second terminal of the drive transistor through the bias adjustment module, so that the potential of the drain of the drive transistor can be adjusted, a potential difference between a potential of a gate of the drive transistor and a potential of a drain of the drive transistor can be reduced, and a voltage bias between the gate of the drive transistor and the drain of the drive transistor can be achieved, thereby balancing the offset phenomenon of the threshold voltage of the drive transistor, reducing the degree of the polarization of ions inside the drive transistor, weakening the offset degree of the threshold voltage of the drive transistor, and improving the display uniformity of the display panel.

Referring to FIGS. 2 and 3, the bias adjustment module 17 includes a first transistor M1, a gate of the first transistor M1 is connected to a first scan signal terminal SC1, and the first transistor M1 is connected between the first terminal N1 of the drive transistor M0 and the bias signal terminal DVI. The first transistor M1 is a P-type transistor, and specifically, the first transistor M1 adopts a low-temperature polysilicon semiconductor transistor such as LTPS-TFT. Based on this, when the first scan signal terminal SC1 provides a high voltage signal, the first transistor M1 is turned off; when the first scan signal terminal SC1 provides a low voltage signal, the first transistor M1 is turned on. In other embodiments, the first transistor is also an N-type transistor, and specifically, the first transistor may adopt an oxide semiconductor transistor such as IGZO-TFT. Based on this, the effective pulse signal provided by the first scan signal terminal is a high voltage signal, which enables the first transistor to be turned on.

As shown in FIGS. 2 and 3, the first dimming module 18 includes a fifth transistor M5. A gate of the fifth transistor M5 is connected to the first dimming control terminal EM1, and the fifth transistor M5 is connected between the first power supply signal terminal VDD and the first terminal N1 of the drive transistor M0. The second dimming module 19 includes a sixth transistor M6. A gate of the sixth transistor M6 is connected to the second dimming control terminal EM2, and the sixth transistor M6 is connected between the second terminal N2 of the drive transistor M0 and the light-emitting element 14. Specifically, the sixth transistor M6 is connected between the second terminal N2 of the drive transistor M0 and the first terminal N4 of the light-emitting element 14. The fifth transistor M5 and the sixth transistor M6 are both P-type transistors.

FIG. 3 is used as an example, the effective pulse signal provided by the first dimming control terminal EM1 is a low voltage signal, so that both the fifth transistor M5 and the sixth transistor M6 are turned on. The ineffective pulse signal provided by the first dimming control terminal EM1 is a high voltage signal, both the fifth transistor M5 and the sixth transistor M6 are turned off. In other embodiments, the fifth transistor and the sixth transistor are N-type transistors, and details are not described here.

Figure 5:
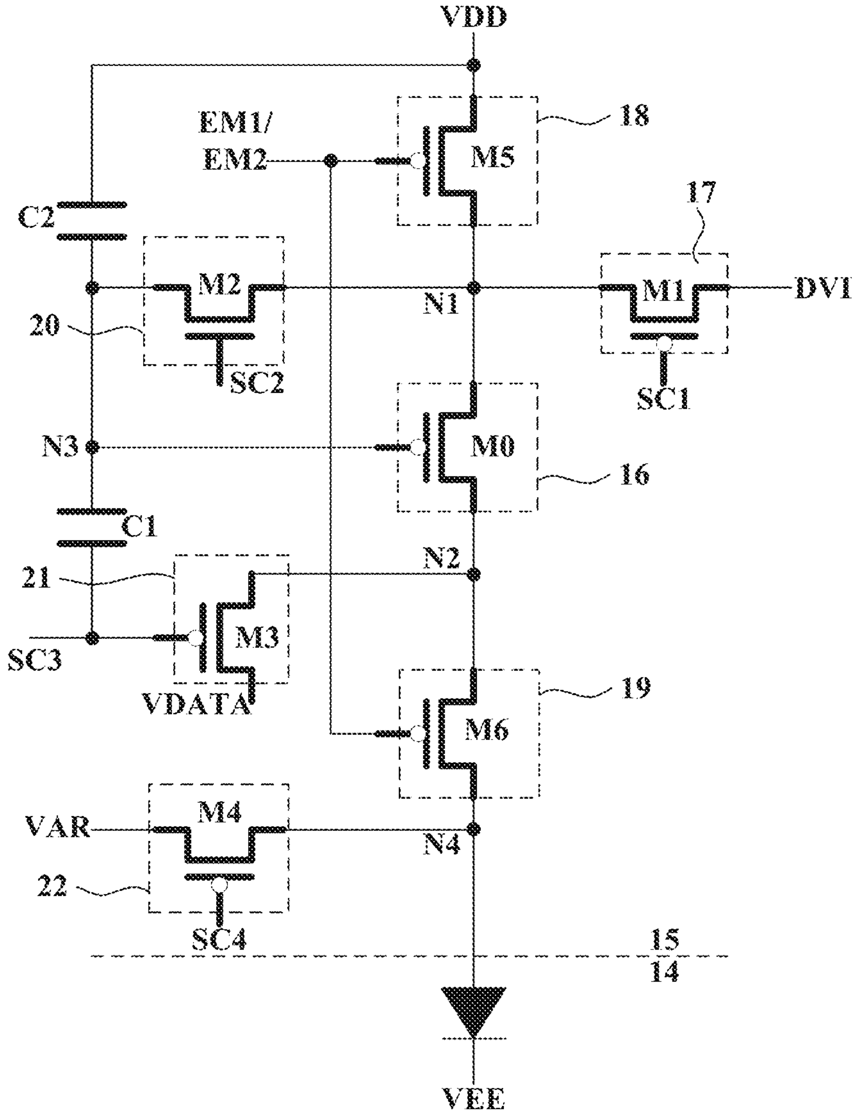
FIG. 5 is a schematic diagram of yet another pixel circuit according to an embodiment of the present disclosure.

FIG. 5 is a schematic diagram of yet another pixel circuit according to an embodiment of the present disclosure. As shown in FIG. 5, the pixel circuit 15 includes a compensation module 20. The compensation module 20 is connected between the first terminal N1 of the drive transistor M0 and the gate N3 of the drive transistor M0, and a control terminal of the compensation module 20 is connected to the second scan signal terminal SC2. The pre-stage includes a compensation stage, and the compensation module 20 is turned on in the compensation stage to compensate for the threshold voltage of the drive transistor M0; and the compensation module 20 is turned off in the bias adjustment stage. The gate N3 of the optional drive transistor M0 is also connected to the first power supply signal terminal VDD through the second capacitor C2.

In this embodiment, the compensation module 20 is connected between the first terminal N1 of the drive transistor M0 and the gate N3 of the drive transistor M0, and the control terminal of the compensation module 20 is connected to the second scan signal terminal SC2. The second scan signal terminal SC2 provides voltage signals alternating between high and low levels. When the second scan signal terminal SC2 provides an effective pulse signal to the control terminal of the compensation module 20, the compensation module 20 is turned on, so that a transmission path of the first terminal N1 of the drive transistor M0 and the gate N3 of the drive transistor M0 are turned on, and a signal may be transmitted between them, so that the voltage of the first terminal N1 of the drive transistor M0 and the gate N3 of the drive transistor M0 may be adjusted, thereby achieving the threshold voltage compensation for the drive transistor M0. When the second scan signal terminal SC2 provides an ineffective pulse signal to the control terminal of the compensation module 20, the compensation module 20 is turned off.

The pre-stage of the pixel circuit 15 further includes a compensation stage. In the compensation stage, the compensation module 20 is turned on and a signal may be transmitted between the first terminal N1 of the drive transistor M0 and the gate N3 of the drive transistor M0, thereby achieving the threshold voltage compensation for the drive transistor M0.

In the bias adjustment stage, the compensation module 20 is turned off, the bias adjustment module 17 is turned on, and the bias signal provided by the bias signal terminal DVI is sequentially written into the first terminal N1 of the drive transistor M0 and the second terminal N2 of the drive transistor M0, and is not written into the gate N3 of the drive transistor M0. Therefore, the voltages of the first terminal N1 and the second terminal N2 of the drive transistor M0 may be adjusted to reduce the potential difference between a potential of the gate N3 of the drive transistor M0 and a potential of the drain of the drive transistor M0, thereby balancing the offset phenomenon of the threshold voltage of the drive transistor M0 in the unbiased adjustment stage, reducing the offset degree of the threshold voltage of the drive transistor M0, and improving the display uniformity of the display panel.

In an embodiment, the compensation module 20 includes a second transistor M2. A gate of the second transistor M2 is connected to the second scan signal terminal SC2, and the second transistor M2 is connected between the first terminal N1 of the drive transistor M0 and the gate N3 of the drive transistor M0. The second transistor M2 is an N-type transistor, and specifically, the second transistor M2 adopts a metal oxide semiconductor transistor such as IGZO-TFT, and the IGZO-TFT has the advantages of high electron mobility, low leakage current, and small volume. Based on this, the effective pulse signal provided by the second scan signal terminal SC2 is a high voltage signal to enable the second transistor M2 to be turned on, and the ineffective pulse signal provided by the second scan signal terminal SC2 is a low voltage signal to enable the second transistor M2 to be turned off.

In an embodiment, the drive transistor M0 is a P-type transistor, and the second transistor M2 is an N-type transistor. Exemplarily, the drive transistor M0 may be a low-temperature polysilicon transistor such as LTPS-TFT, the LTPS-TFT is a P-type transistor and has the advantage of high electron mobility, thereby improving the response speed. The second transistor M2 may be a metal oxide transistor such as IGZO-TFT, the IGZO-TFT is an N-type transistor and has the advantages of high electron mobility, low leakage current, and small volume.

The LTPS-TFT and the IGZO-TFT are used in the pixel circuit 15, and the advantages of the two transistors may be combined, thereby achieving higher electron mobility, lower power consumption and higher stability. In other embodiments, the drive transistor may be an N type transistor, and/or the second transistor may be a P type transistor, which will not be described in detail.

In an embodiment, in part of a time period of the compensation stage, the bias adjustment module 17 is turned on, and the bias signal terminal DVI provides a reset signal for the first terminal N1 of the drive transistor M0; and in other time periods of the compensation stage, the bias adjustment module 17 is turned off.

In this embodiment, the bias adjustment module 17 may be also served as a reset module. Specifically, the bias signal terminal DVI provides a bias signal to the first terminal N1 of the drive transistor M0 in the bias adjustment stage, and the bias signal terminal DVI provides a reset signal to the first terminal N1 of the drive transistor M0 in the reset stage. The part of the time period of the compensation stage is also served as a reset stage. In other embodiments, the time period of the compensation stage and the time period of the reset stage are overlapped or performed at intervals. The working process of the pixel circuit 15 includes a reset stage and a compensation stage, and the part of the time period of the compensation stage is also served as the reset stage. It should be understood that the reset stage is to reset the gate N3 of the drive transistor M0, and then the drive transistor M0 is turned on, so that the bias signal terminal DVI provides a reset signal to control the drive transistor M0 to be turned on.

In the compensation stage, the compensation module 20 is turned on, and a signal is transmitted between the first terminal N1 of the drive transistor M0 and the gate N3 of the drive transistor M0, thereby achieving the threshold voltage compensation for the drive transistor M0.

In the reset stage, the compensation module 20 remains turned on while the bias adjustment module 17 is turned on, and the bias signal terminal DVI provides a reset signal. Then, the reset signal provided by the bias signal terminal DVI is sequentially written into the first terminal N1 of the drive transistor M0 and the gate N3 of the drive transistor M0 via the bias adjustment module 17 and the compensation module 20 to reset the gate N3 of the drive transistor M0. When the drive transistor M0 is turned on, the reset signal provided by the bias signal terminal DVI is also written from the first terminal N1 of the drive transistor M0 to the second terminal N2 of the drive transistor M0. In the reset stage, when the reset signal is written into the first terminal N1 of the drive transistor M0, the gate N3 of the drive transistor M0, and the second terminal N2 of the drive transistor M0, voltages of the three terminals (N1, N2, N3) of the drive transistor M0 are the same, so that the bias effect of different pictures or previous pictures on the drive transistor M0 can be reduced or eliminated, and the drive current of the drive transistor M0 can be refreshed to improve the display effect, thereby improving the problem of smearing or flickering during the switching of the low-frequency display picture, and improving the display effect.

In other time periods of the compensation stage, the bias adjustment module 17 is turned off, and the variation of the signal at the bias signal terminal DVI does not affect the potential of the first terminal N1, the gate N3 and the second terminal N2 of the drive transistor M0, thereby ensuring the effect of the threshold voltage compensation of the drive transistor M0.

In this embodiment, the drive transistor M0 is a P-type transistor, the bias signal provided by the bias signal terminal DVI in the bias adjustment stage is a high-level signal, and the reset signal provided by the bias signal terminal DVI in the compensation stage is a low-level signal. In other embodiments, the drive transistor is an N-type transistor, the bias signal provided by the bias signal terminal at the bias adjustment stage is a low level signal, and the reset signal provided by the bias signal terminal in the compensation stage is a high level signal.

As shown in FIG. 5, the drive transistor M0 is a P-type transistor. In the bias adjustment stage, when the bias signal provided by the bias signal terminal DVI is a high level signal, the bias signal is sequentially written into the first terminal N1 and the second terminal N2 of the drive transistor M0 via the bias adjustment module 17 and the drive transistor M0 which are turned on, so that the potential of the drain (N2) of the drive transistor M0 can be increased; the potential difference between the potential of the gate of the drive transistor M0 and the potential of the drain of the drive transistor M0 is reduced, so that the voltage bias between the gate of the drive transistor M0 and the drain of the drive transistor M0 is achieved. In the reset stage, the reset signal provided by the bias signal terminal DVI is a low-level signal, and the reset signal is sequentially written into the first terminal N1 and the gate N3 of the drive transistor M0 via the bias adjustment module 17 and the compensation module 20 which are turned on. The low-voltage reset signal enables the drive transistor M0 to be turned on, and the reset signal is written into the second terminal N2 via the first terminal N1 of the drive transistor M0 so that the voltages at the three terminals of the drive transistor M0 are the same.

Similarly, the drive transistor is an N-type transistor. In the bias adjustment stage, when the bias signal provided by the bias signal terminal is a low level signal, the bias signal is written into the first terminal N1 (drain) of the drive transistor via the bias adjustment module which is turned on, so that the potential of the drain (N1) of the drive transistor can be reduced, and the potential difference between the potential of the gate and the potential of the drain of the drive transistor can be reduced. In the reset stage, when the reset signal provided by the bias signal terminal is a high-level signal, the reset signal is written into the gate of the drive transistor via the bias adjustment module and the compensation module which are turned on, so that the drive transistor may be turned on.

As shown in FIG. 5, the pixel circuit 15 includes a data write module 21. The data write module 21 is connected between the second terminal N2 of the drive transistor M0 and the data signal terminal VDATA, and a control terminal of the data write module 21 connected to a third scan signal terminal SC3. The pre-stage includes a data write stage, in the data write stage, the data write module 21 is turned on, the bias adjustment module 17 is turned off, and the data signal terminal VDATA provides a data signal to the drive transistor M0. The data write module 21 is turned off in the bias adjustment stage.

In this embodiment, the signal provided by the third scan signal terminal SC3 is changed in the high-low level, and the change in the high-low level of the third scan signal terminal SC3 controls the on-off state of the data write module 21 to be switched. When a signal provided by the third scan signal terminal SC3 is an effective pulse signal, the data write module 21 is turned on, and the data signal provided by the data signal terminal VDATA is directly written into the second terminal N2 of the drive transistor M0. When the signal provided by the third scan signal terminal SC3 is switched to an ineffective pulse signal, the data write module 21 is turned off.

The pre-stage of the pixel circuit 15 includes a data write stage, in the data write stage, the data write module 21 is turned on, the bias adjustment module 17 is turned off, and the data signal provided by the data signal terminal VDATA is written into the second terminal N2 of the drive transistor M0. In the bias adjustment stage, the data write module 21 is turned off, the bias adjustment module 17 is turned on, and the bias signal provided by the bias signal terminal DVI is written into the first terminal N1 and the second terminal N2 of the drive transistor M0.

In an embodiment, the data write module 21 includes a third transistor M3. A gate of the third transistor M3 is connected to the third scan signal terminal SC3, and the third transistor M3 is connected between the second terminal N2 of the drive transistor M0 and the data signal terminal VDATA. The data write module 21 includes a first capacitor C1. The first capacitor C1 is connected between the gate N3 of the drive transistor M0 and the gate of the third transistor M3. The third transistor M3 is a P-type transistor, based on this, the effective pulse signal provided by the third scan signal terminal SC3 is a low voltage signal to enable the third transistor M3 to be turned on, and the ineffective pulse signal provided by the third scan signal terminal SC3 is a high voltage signal to enable the third transistor M3 to be turned off. In other embodiments, the third transistor is an N-type transistor, and the effective pulse signal provided by the third scan signal terminal is a high voltage signal to enable the third transistor to be turned on.

In an embodiment, in part of a time period of the compensation stage, the data write module 21 is turned on to enable the pixel circuit to simultaneously execute the data write stage.

In the compensation stage, the compensation module 20 is turned on, and a signal is transmitted between the first terminal N1 of the drive transistor M0 and the gate N3 of the drive transistor M0, thereby achieving the threshold voltage compensation for the drive transistor M0.

In the data write stage, the compensation module 20 remains turned on while the data write module 21 and the drive transistor M0 are turned on, and the data signal terminal VDATA provides a data signal and writes the data signal into the three terminals (N1, N2, N3) of the drive transistor M0.

In the bias adjustment stage, the compensation module 20 is turned off while the data write module 21 is turned off, the bias adjustment module 17 is turned on, and the bias signal provided by the bias signal terminal DVI is written into the first terminal N1 and the second terminal N2 of the drive transistor M0.

As shown in FIG. 5, the pixel circuit 15 includes an initialization module 22. The initialization module 22 is connected between the light-emitting element 14 and the initialization signal terminal VAR, and a control terminal of the initialization module 22 is connected to a fourth scan signal terminal SC4. The pre-stage includes an initialization stage, the initialization module 22 is turned on in the initialization stage, and the initialization signal terminal VAR provides an initialization signal to the light-emitting element 14. Specifically, the initialization module 22 is connected between the first electrode N4 of the light-emitting element 14 and the initialization signal terminal VAR.

In this embodiment, the signal provided by the fourth scan signal terminal SC4 is changed in the high-low level, and the change in the high-low level of the fourth scan signal terminal SC4 controls the on-off state of the initialization module 22 to be switched. When the signal provided by the fourth scan signal terminal SC4 is an effective pulse signal, the initialization module 22 is turned on, and an initialization signal provided by the initialization signal terminal VAR is written into the first electrode N4 of the light-emitting element 14 to initialize the light-emitting element 14. When a signal provided by the fourth scan signal terminal SC4 is an ineffective pulse signal, the initialization module 22 is turned off. The pre-stage of the pixel circuit 15 includes an initialization stage, the initialization module 22 is turned on in the initialization stage, and an initialization signal of the initialization signal terminal VAR is written into the first electrode N4 of the light-emitting element 14 to initialize the light-emitting element 14. The initialization signal provided by the initialization signal terminal VAR is a low voltage signal, but is not limited thereto.

In an embodiment, the initialization module 22 includes a fourth transistor M4. A gate of the fourth transistor M4 is connected to the fourth scan signal terminal SC4, and the fourth transistor M4 is connected between the light-emitting element 14 and the initialization signal terminal VAR. The fourth transistor M4 is a P-type transistor, based on this, the effective pulse signal provided by the fourth scan signal terminal SC4 is a low voltage signal to enable the fourth transistor M4 to be turned on, and the ineffective pulse signal provided by the fourth scan signal terminal SC4 is a high voltage signal to enable the fourth transistor M4 to be turned off. In other embodiments, the fourth transistor is an N-type transistor, and the effective pulse signal provided by the fourth scan signal terminal is a high voltage signal to enable the fourth transistor to be turned on.

In an embodiment, the first scan signal terminal SC1 is also served as the fourth scan signal terminal SC4. That is, the first scan signal terminal SC1 and the fourth scan signal terminal SC4 in the pixel circuit 15 are connected to the same scan signal line. The bias adjustment module 17 and the initialization module 22 are both P-type transistors or N-type transistors. FIG. 5 is used as an example, if the first scan signal terminal SC1 provides a low-level signal, the bias adjustment module 17 and the initialization module 22 are simultaneously turned on, so that the duration of the pre-stage of the pixel circuit 15 can be reduced, thereby facilitating the high-frequency driving display. If the first scan signal terminal SC1 provides a high level signal, the bias adjustment module 17 and the initialization module 22 may be simultaneously turned off.

It should be noted that the pre-stage of the pixel circuit 15 includes multiple functional stage, and the multiple functional stage includes at least a bias adjustment stage, a compensation stage, a reset stage, a data write stage, and an initialization stage. The execution time periods of some functional stages in the pre-stage may be partially overlapped, completely overlapped or completely covered under the premise of ensuring the normal working of the pixel circuit 15. Exemplarily, the part of the time period of the compensation stage is also served as the reset stage, the part of the time period of the compensation stage is also served as the data write stage, and so on, but not limited thereto. Those skilled in the art may reasonably design the working process of the pixel circuit according to the requirements of the product. In addition, the structure of the pixel circuit may be reasonably designed according to the requirements of the product, which is not limited to the 7T2C structure shown in FIG. 5.

In an embodiment, the bias adjustment stage includes a first sub-stage and a second sub-stage disposed at intervals. In the first sub-stage, the compensation module is turned off and the bias adjustment module is turned on. In the second sub-stage, the compensation module is turned off and the bias adjustment module is turned on. The compensation stage is between the first sub-stage and the second sub-stage.

Figure 6:
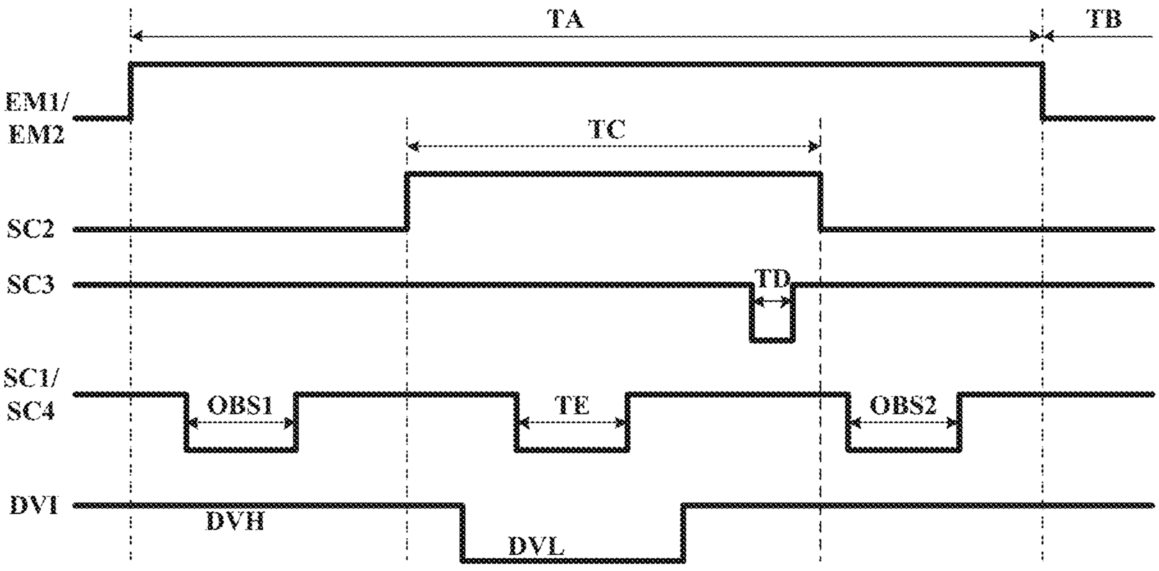
FIG. 6 is a timing diagram of the pixel circuit shown in FIG. 5.

FIG. 6 is a timing diagram of the pixel circuit shown in FIG. 5. As shown in conjunction with FIGS. 5 and 6, the bias adjustment stage includes a first sub-stage OBS1 and a second sub-stage OBS2 disposed at intervals. In the first sub-stage OBS1, the compensation module 20 is turned off and the bias adjustment module 17 is turned on. In the second sub-stage OBS2, the compensation module 20 is turned off and the bias adjustment module 17 is turned on. The compensation stage TC is between the first sub-stage OBS1 and the second sub-stage OBS2.

The working process of the pixel circuit 15 includes a pre-stage TA and a light-emitting stage TB. In the pre-stage TA, the first dimming control terminal EM1 provides a high voltage signal to enable both the fifth transistor M5 and the sixth transistor M6 to be turned off. In the light-emitting stage TB, the first dimming control terminal EM1 provides a low voltage signal to enable both the fifth transistor M5 and the sixth transistor M6 to be turned on.

The pre-stage TA includes a compensation stage TC. In the compensation stage TC, the second scan signal terminal SC2 provides a high voltage signal so that the second transistor M2 is turned on. In other time periods of the pre-phase TA, the second scan signal terminal SC2 provides a low voltage signal to enable the second transistor M2 to be turned off.

The pre-stage TA includes a data write stage TD. In the data write stage TD, the third scan signal terminal SC3 provides a low voltage signal to enable the third transistor M3 to be turned on. In other time periods, the third scan signal terminal SC3 provides a high voltage signal to enable the third transistor M3 to be turned off.

The pre-stage TA includes a reset stage TE. In the reset stage TE, the first scan signal terminal SC1 provides a low voltage signal to enable the first transistor M1 to be turned on. The pre-stage TA further includes an initialization stage, a time period of the initialization stage completely overlaps with a time period of the reset stage TE, but is not limited thereto. The fourth scan signal terminal SC4 provides a low voltage signal in the initialization stage to enable the fourth transistor M4 to be turned on.

The pre-stage TA includes a first sub-stage OBS1. In the first sub-stage OBS1, the first scan signal terminal SC1 provides a low voltage signal to enable the first transistor M1 to be turned on. The pre-stage TA includes a second sub-stage OBS2. In the second sub-stage OBS2, the first scan signal terminal SC1 provides a low voltage signal to enable the first transistor M1 to be turned on.

As described above, the working process of the pre-stage TA of the pixel circuit 15 is as follows.

In the first sub-stage OBS1, the fifth transistor M5 and the sixth transistor M6 are turned off, the second transistor M2 is turned off, the third transistor M3 is turned off, both the first transistor M1 and the fourth transistor M4 are turned on, and the drive transistor M0 is turned on. The bias signal terminal DVI provides bias signals of a high voltage (DVH), the signals of the high voltage are sequentially written into the first terminal N1 and the second terminal N2 (drain) of the drive transistor M0, so that the potential of the drain of the drive transistor M0 can be increased and a potential difference between the drain and the gate of the drive transistor M0 can be reduced. At this stage, the signal provided by the initialization signal terminal VAR may be a high voltage and does not initialize the light-emitting element 14.

In the reset stage TE, both the fifth transistor M5 and the sixth transistor M6 are turned off, the second transistor M2 is turned on, the third transistor M3 is turned off, both the first transistor M1 and the fourth transistor M4 are turned on, and the drive transistor M0 is turned on. The bias signal terminal DVI provides reset signals of a low voltage (DVL), the signals of the low voltage are written into the first terminal N1 of the drive transistor M0, the gate N3 of the drive transistor M0, and the second terminal N2 (drain) of the drive transistor M0, respectively. At this stage, the signal provided by the initialization signal terminal VAR may be a low voltage, and the light-emitting element 14 is initialized, that is, the reset stage TE is also served as the initialization stage.

In the data write stage TD, both the fifth transistor M5 and the sixth transistor M6 are turned off, both the second transistor M2 and the third transistor M3 are turned on, and both the first transistor M1 and the fourth transistor M4 are turned off. The data signal terminal VDATA provides a data signal and writes the data signal to the second terminal N2 (drain) of the drive transistor M0. If the drive transistor M0 is turned on, the data signal is also written into the first terminal N1 of the drive transistor M0 and the gate N3 of the drive transistor M0.

In the second sub-stage OBS2, the fifth transistor M5 and the sixth transistor M6 are turned off, the second transistor M2 is turned off, the third transistor M3 is turned off, both the first transistor M1 and the fourth transistor M4 are turned on, and the drive transistor M0 is turned on. The bias signal terminal DVI provides bias signals of a high voltage (DVH), the signals of the high voltage are sequentially written into the first terminal N1 of the drive transistor M0 and the second terminal N2 (drain) of the drive transistor M0, so that the potential of the drain of the drive transistor M0 can be increased and a potential difference between the drain of the drive transistor M0 and the gate of the drive transistor M0 can be reduced. At this stage, the signal provided by the initialization signal terminal VAR may be a high voltage and does not initialize the light-emitting element 14.

The working process of the light-emitting stage TB of the pixel circuit 15 is as follows. Both the fifth transistor M5 and the sixth transistor M6 are turned on, the second transistor M2 is turned off, the third transistor M3 is turned off, both the first transistor M1 and the fourth transistor M4 are turned off, and the drive transistor M0 is turned on. The drive transistor M0 supplies the drive current to the light-emitting element 14 according to the voltage signal provided by the first power supply signal terminal VDD.

Figure 7:
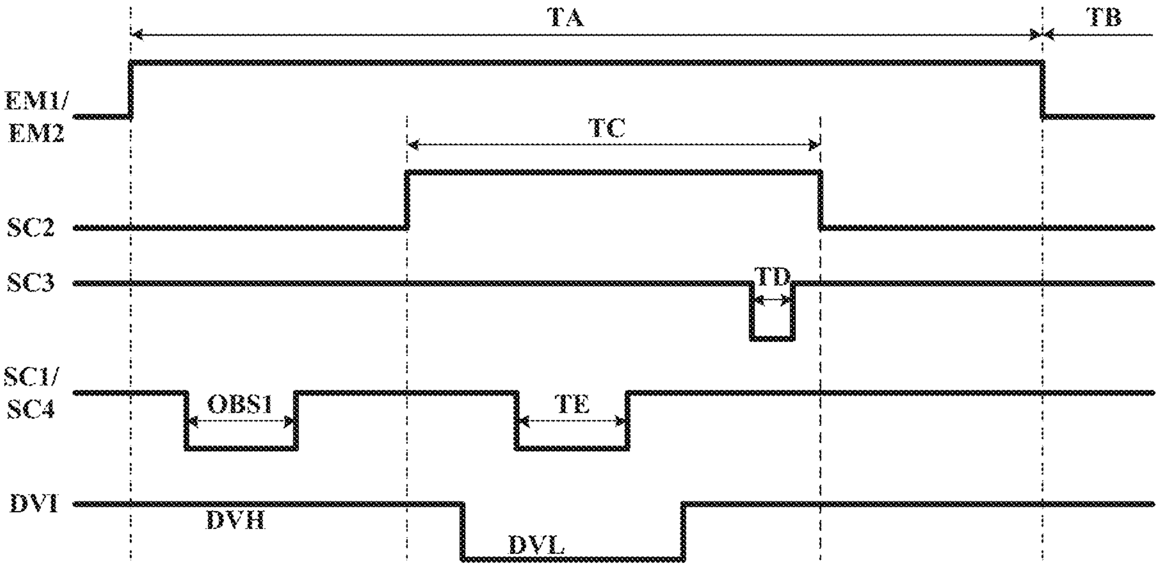
FIG. 7 is another timing diagram of the pixel circuit shown in FIG. 5.

FIG. 7 is another timing diagram of the pixel circuit shown in FIG. 5. As shown in conjunction with FIGS. 5 and 7, the bias adjustment stage includes only the first sub-stage OBS1. In the first sub-stage OBS1, the compensation module 20 is turned off and the bias adjustment module 17 is turned on. In the first sub-stage OBS1, the bias signal terminal DVI provides bias signals of a high voltage (DVH), the signals of the high voltage are sequentially written into the first terminal N1 of the drive transistor M0 and the second terminal N2 (drain) of the drive transistor M0, so that the potential of the drain of the drive transistor M0 can be increased and the potential difference between the drain and the gate of the drive transistor M0 can be reduced.

Figure 8:
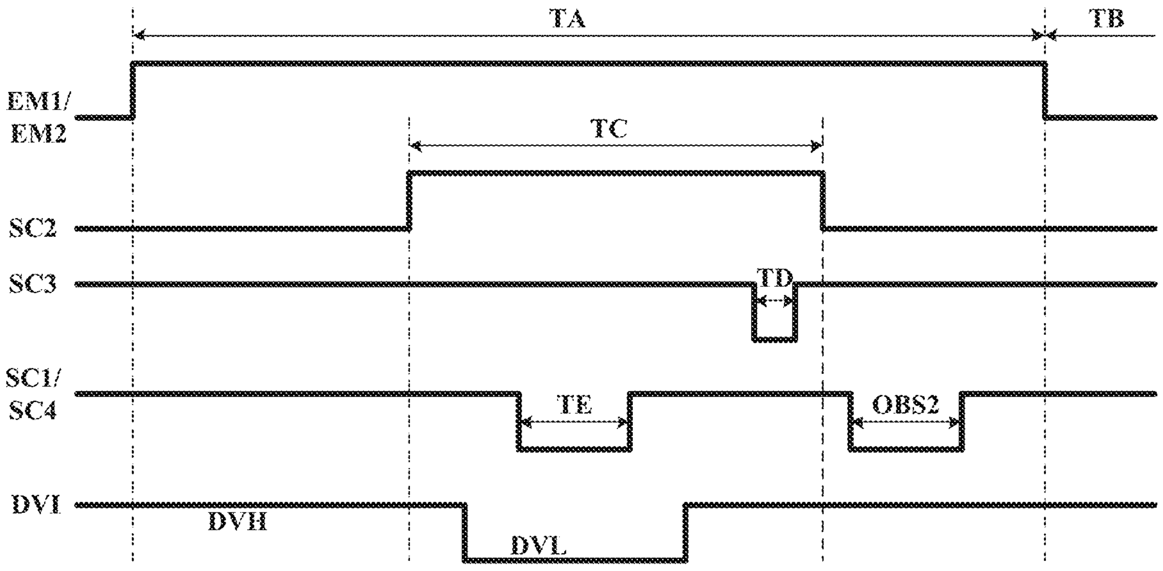
FIG. 8 is yet another timing diagram of the pixel circuit shown in FIG. 5.

FIG. 8 is yet another timing diagram of the pixel circuit shown in FIG. 5. As shown in conjunction with FIGS. 5 and 8, the bias adjustment stage includes only the second sub-stage OBS2. In the second sub-stage OBS2, the compensation module 20 is turned off and the bias adjustment module 17 is turned on. In the second sub-stage OBS2, the bias signal terminal DVI provides bias signals of a high voltage (DVH), the signals of high voltage are sequentially written into the first terminal N1 and the second terminal N2 (drain) of the drive transistor M0, so that the potential of the drain of the drive transistor M0 can be increased and the potential difference between the drain and the gate of the drive transistor M0 can be reduced.

It should be understood that the structure of the pixel circuit changes, for example, if the pixel circuit is a 8T1C structure, or if types of one or more transistors in the pixel circuit change, the timing of driving the pixel circuit also changes. FIGS. 6 to 8 are only three different driving timings of the pixel circuit 15 shown in FIG. 5, and the driving timing of the pixel circuit is not limited thereto. The relevant practitioners can reasonably design the driving timing of the pixel circuit according to the change of the structure of the pixel circuit, which will not be illustrated and described herein.

As shown in FIG. 5, the third scan signal terminal SC3 provides a third scan signal, and the first scan signal terminal SC1 provides a first scan signal. A pulse variation frequency of the third scan signal is less than a pulse variation frequency of the first scan signal.

The pulse change of the third scan signal controls the switching of the on/off state of the data write module 21, so that the pulse variation frequency of the third scan signal may represent a number of turn-on times of the data write module 21, and when the data write module 21 is turned on, the data signal provided by the data signal terminal VDATA is written into the second terminal N2 of the drive transistor M0.

When the pulse change of the first scan signal controls the switching of the on-off state of the bias adjustment module 17, the pulse variation frequency of the first scan signal can represent a number of turned-on times of the bias adjustment module 17. When the bias adjustment module 17 is turned on, the bias signal provided by the bias signal terminal DVI is written into the first terminal N1 and the second terminal N2 of the drive transistor M0.

As described above, when the pulse variation frequency of the third scan signal is less than the pulse variation frequency of the first scan signal, the number of turn-on times of the data write module 21 is less than the number of turn-on times of the bias adjustment module 17 in the pre-stage of the pixel circuit 15. That is, in the pre-stage of the pixel circuit 15, the bias adjustment operation is more frequent than the data write operation, so that the offset degree of the threshold voltage of the drive transistor M0 can be reduced, and the display effect can be improved.

Figure 9:
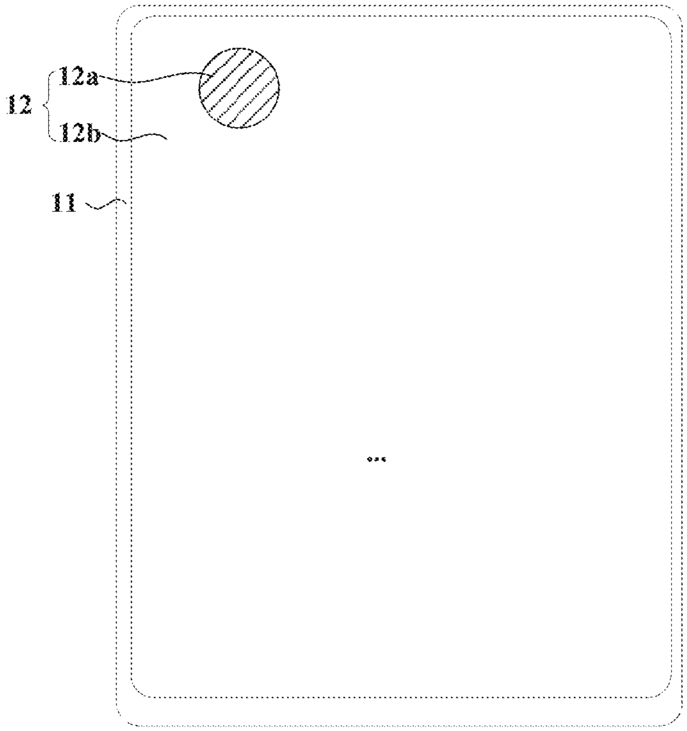
FIG. 9 is a schematic diagram of another display panel according to an embodiment of the present disclosure.

FIG. 9 is a schematic diagram of another display panel according to an embodiment of the present disclosure. As shown in FIG. 9, the display panel includes a first display region 12*a* and a second display region 12*b*. A first frequency difference value is not equal to a second frequency difference value, where the first frequency difference value is a difference between the pulse variation frequency of the first scan signal and the pulse variation frequency of the third scan signal in the first display region 12*a*, and the second frequency difference value is a difference between the pulse variation frequency of the first scan signal and the pulse variation frequency of the third scan signal in the second display region 12*b*.

In this embodiment, the display region 12 of the display panel is divided into multiple display regions, and the multiple display regions include at least the first display region 12*a* and the second display region 12*b*. The first display region 12*a* is used for display and may also be used as a function device region, and the functional device such as a camera may be disposed in the first display region 12*a*. The second display region 12*b* is mainly used for display. Then, when a frame of picture is displayed, a brightness of the first display region 12*a* is different from a brightness of the second display region 12*b*.

Based on this, a first frequency difference value of the first display region 12*a* is designed to be not equal to a second frequency difference value of the second display region 12*b*. The first frequency difference value is a difference between the pulse variation frequency of the first scan signal and the pulse variation frequency of the third scan signal in the first display region 12*a*, and the second frequency difference value is a difference between the pulse variation frequency of the first scan signal and the pulse variation frequency of the third scan signal in the second display region 12*b*.

When a frame of picture is displayed, the brightness of the first display region 12*a* may be lower than the brightness of the second display region 12*b*, and the threshold offset degree of the drive transistor M0 in the first display region 12*a* may be lower than the threshold offset degree of the drive transistor M0 in the second display region 12*b*. In this case, the number of turn-on times of the bias adjustment module 17 in the first display region 12*a* may be reduced on the basis of the original design number, and the number of turn-on times of the bias adjustment module 17 in the second display region 12*b* may be increased on the basis of the original design number. The number of turn-on times of the bias adjustment module 17 in the first display region 12*a* is reduced, and if the pulse variation frequency of the third scan signal is unchanged, then a difference between the pulse variation frequency of the first scan signal and the pulse variation frequency of the third scan signal is reduced, that is, the first frequency difference value is reduced. The number of turn-on times of the bias adjustment module 17 in the second display region 12*b* may be increased, if the pulse variation frequency of the third scan signal is unchanged, the difference between the pulse variation frequency of the first scan signal and the pulse variation frequency of the third scan signal is increased, that is, the second frequency difference value is increased. The first frequency difference value is therefore designed to be less than the second frequency difference value.

It should be noted that the first frequency difference value is not equal to the second frequency difference value, but is not limited to the case where the first frequency difference value is less than the second frequency difference value. Depending on the function or display requirements of the first display region and the second display region, the pulse variation frequency of the first scan signal and/or the pulse variation frequency of the third scan signal in the first display region may be independently designed to adjust the first frequency difference value. The pulse variation frequency of the first scan signal and/or the pulse variation frequency of the third scan signal in the second display region may also be independently designed to adjust the second frequency difference value, but is not limited thereto.

Figure 10:
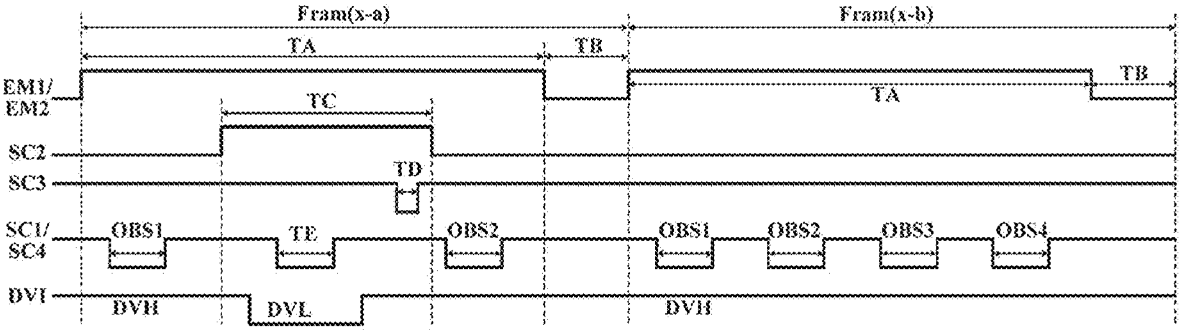
FIG. 10 is yet another timing diagram of the pixel circuit shown in FIG. 5.

FIG. 10 is yet another timing diagram of the pixel circuit shown in FIG. 5. As shown in conjunction with FIGS. 5 and 10, the working process of the pixel circuit 15 includes a data write frame and a retention frame. A number of turn-on times of the bias adjustment module 17 in the retention frame is greater than a number of turn-on times of the bias adjustment module 17 in the data write frame.

The duration of one working process of the pixel circuit 15 is the duration of 1 frame of refresh picture. There is a case where the 1 frame of refresh picture of the display panel includes multi-frame sub-pictures. Based on this, in the multi-frame sub-picture of the 1 frame of refresh picture, at least 1 frame of sub-picture is a data write frame and at least 1 frame of sub-picture is the retention frame. A data signal is written in the data write frame, and no data signal is written in the retention frame. For example, 1 frame of refresh picture frame (x) is used as an example, the 1 frame of refresh picture frame (x) includes 1 data write frame frame (x-a) and at least one retention frame frame (x-b).

In this embodiment, in the 1 frame of refresh picture frame (x), it is designed that the number of turn-on times of the bias adjustment module 17 in the retention frame frame frame (x-b) is greater than the number of turn-on times that the bias adjustment module 17 in the data write frame frame (x-a). Specifically, in the data write frame frame (x-a), the pre-stage of the pixel circuit 15 includes at least a data write stage TD, a reset stage/initialization stage TE, a compensation stage TC, and the like; while in the retention frame frame (x-b), the pre-stage of the pixel circuit 15 does not need to perform a data write operation, a reset operation, an initialization operation, a threshold compensation operation, and the like. With the characteristics of the retention frame frame (x-b), the bias adjustment operation may be performed multiple times at the pre-stage thereof, that is, the pre-stage includes multiple bias adjustment stages, thereby reducing the threshold offset degree of the drive transistor M0. Based on this, it is designed that the number of turn-on times of the bias adjustment module 17 of the pixel circuit 15 in the retention frame frame (x-b) is greater than the number of turn-on times of the bias adjustment module 17 of the pixel circuit 15 in the data write frame frame (x-a).

FIG. 10 is used as an example, the pre-stage TA of the bias adjustment module 17 of the pixel circuit 15 in the retention frame (x-b) includes 4 bias adjustment stages OBS1-OBS4, that is, the bias adjustment module 17 is turned on 4 times in the retention frame (x-b). The pre-stage TA of the bias adjustment module 17 of the pixel circuit 15 in the data write frame (x-a) includes 2 bias adjustment stages OBS1-OBS2, that is, the bias adjustment module 17 is turned on 2 times in the data write frame (x-a). Multiple bias adjustment operations are performed in the retention frame to reduce the threshold offset degree of the drive transistor M0.

In an embodiment, the display panel includes a first display region and a second display region. A first turn-on difference value is not equal to a second turn-on difference value, where the first turn-on difference value is a difference between a number of turn-on times of the bias adjustment module in the retention frame and a number of turn-on times of the bias adjustment module in the data write frame in the first display region, and the second turn-on difference value is a difference between a number of turn-on times of the bias adjustment module in the retention frame and a number of turn-on times of the bias adjustment module in the data write frame in the second display region.

As shown in conjunction with FIG. 5, FIG. 9 and FIG. 10, when a frame of picture is displayed, the brightness of the first display region 12*a* may be different from the brightness of the second display region 12*b*.

Exemplarily, when a frame of picture is displayed, the brightness of the first display region 12*a* may be lower than the brightness of the second display region 12*b*, and the threshold offset degree of the drive transistor M0 of the first display region 12*a* may be lower than the threshold offset degree of the drive transistor M0 of the second display region 12*b*. In this case, the number of turn-on times of the bias adjustment module 17 in the first display region 12*a* may be reduced on the basis of the original design number, and the number of turn-on times of the bias adjustment module 17 in the second display region 12*b* may be increased on the basis of the original design number.

Correspondingly, in the first display region 12*a*, the number of turn-on times of the bias adjustment module 17 in the retention frame (x-b) may be reduced on the basis of the original design number, and in the second display region 12*b*, the number of turn-on times of the bias adjustment module 17 in the retention frame (x-b) may be increased on the basis of the original design number. If the number of turn-on times of the bias adjusting module 17 in the data write frame frame (x-a) is consistent in the display region 12, then in the first display region 12*a*, the difference between the number of turn-on times of the bias adjustment module 17 in the retention frame frame (x-b) and the number of turn-on times of the bias adjustment module 17 in the data write frame (x-a) decreases, i. e. the first turn-on difference value decreases; while in the second display region 12*b*, the difference between the number of turn-on times if the bias adjustment module 17 in the retention frame frame (x-b) and the number of turn-on times of the bias adjustment module

17 in the data write frame (x-a) increases, i. e. the second turn-on difference value increases.

The first turn-on difference value may be designed to be less than the second turn-on difference value.

It should be noted that the first turn-on difference value is not equal to the second turn-on difference value, but is not limited to a case where the first turn-on difference value is less than the second turn-on difference value. Depending on the functions or display requirements of the first display region and the second display region, the number of turn-on times of the bias adjustment module in the retention frame and/or the number of turn-on times of the bias adjustment module in the data write frame in the first display region may be independently designed to adjust the first turn-on difference value. It is also possible to independently design the number of turn-on times of the bias adjustment module in the retention frame and/or the number of turn-on times of the bias adjustment module in the data write frame in the second display region to adjust the second turn-on difference value, and but is not limited thereto.

Figure 11:
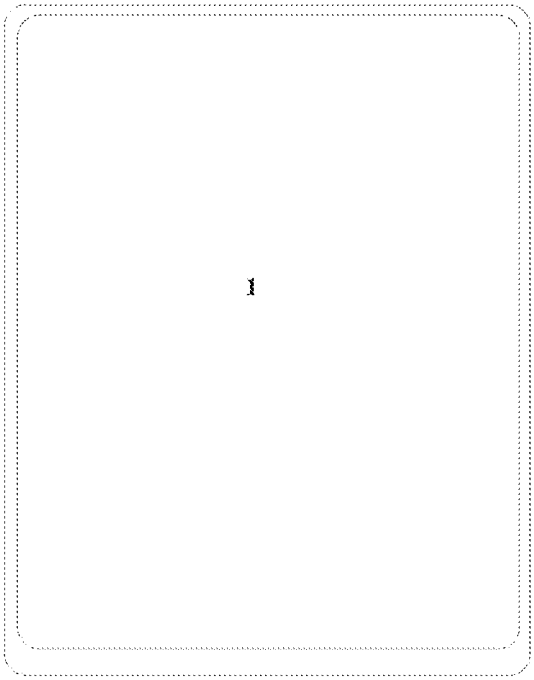
FIG. 11 is a schematic diagram of a display device according to an embodiment of the present disclosure.

Based on the same inventive concept, an embodiment of the present disclosure further provides a display device including the display panel described above. The display panel may be an organic light-emitting display panel or a micro LED display panel, but is not limited thereto. FIG. 11 is a schematic diagram of a display device according to an embodiment of the present disclosure. As shown in FIG. 11, the display device may be applied to an electronic device 1 such as a smartphone or a tablet computer. It should be understood that the above-described embodiments provide only some examples of the structure of the pixel circuit, and that the display panel includes other structures, and details are not described herein.

In this embodiment, a bias adjustment module is provided to provide a bias signal to the drain of the drive transistor, thereby achieving the voltage bias to the drive transistor, reducing the threshold voltage offset degree of the drive transistor, and improving the display effect.

The display panel includes a non-bias stage such as a light-emitting stage, and at this stage, when the PMOS-type drive transistor is turned on, there may be a case that the potential of the gate of the drive transistor is higher than the potential of the drain of the drive transistor, and a voltage difference between the gate of the drive transistor and the drain of the drive transistor may be large, which may cause the Id-Vg curve of the drive transistor to be offset, thereby causing the threshold voltage Vth of the drive transistor to be offset. In order to improve the phenomenon, the bias adjustment stage is provided in the pre-stage, so that the potential of the gate of the drive transistor is lower than the potential of the drain of the drive transistor, the potential difference between the potential of the gate of the drive transistor and the potential of the drain of the drive transistor is adjusted, the offset phenomenon of the Id-Vg curve is weakened, and the offset phenomenon of the threshold voltage Vth of the drive transistor is weakened.

Similarly, when an NMOS-type drive transistor is turned on in the light-emitting stage, there may be a case that the potential of the gate of the drive transistor may be lower than the potential of the drain of the drive transistor, which may cause the threshold voltage Vth of the drive transistor to be offset. The bias adjustment stage is provided in the pre-stage, so that the potential of the gate of the drive transistor is higher than the potential of the drain of the drive transistor, and the offset phenomenon of the threshold voltage Vth of the drive transistor is weakened.

It should be understood that various forms of the flows, the reordering step, the adding step or the deleting step shown above may be used. For example, as long as the desired result of the technical scheme provided in the present disclosure may be achieved, the steps described in the present disclosure may be executed in parallel, sequentially or in different orders, which is not limited herein.

The above implementations should not be construed as limiting the protection scope of the present disclosure. It should be understood by those skilled in the art that various modifications, combinations, sub-combinations and substitutions may be made, depending on design requirements and other factors. Any modification, equivalent replacement, and improvement made within the spirit and principle of the present disclosure should be included within the protection scope of the present disclosure.

What is claimed is:

1. A display panel, comprising:

a pixel circuit and a light-emitting element, wherein the pixel circuit comprises a drive circuit and a bias adjustment circuit, the drive circuit is configured to provide a drive current to the light-emitting element and comprises a drive transistor, the bias adjustment circuit is connected between a first terminal of the drive transistor and a bias signal terminal, a control terminal of the bias adjustment circuit is connected to a first scan signal terminal, and a second terminal of the drive transistor is coupled to the light-emitting element; and wherein a working process of the pixel circuit comprises a pre-stage, the pre-stage comprises a bias adjustment stage, the bias adjustment circuit is turned on in the bias adjustment stage, and the bias signal terminal provides a bias signal to the first terminal of the drive transistor, wherein the pixel circuit comprises a compensation circuit, the compensation circuit is connected between the first terminal of the drive transistor and a gate of the drive transistor, and a control terminal of the compensation circuit is connected to a second scan signal terminal;

the pre-stage comprises a compensation stage, and the compensation circuit is turned on in the compensation stage to compensate for a threshold voltage of the drive transistor; and the compensation circuit is turned off in the bias adjustment stage, wherein the bias adjustment stage comprises a first sub-stage and a second sub-stage disposed at intervals;

in the first sub-stage, the compensation circuit is turned off and the bias adjustment circuit is turned on;

in the second sub-stage, the compensation circuit is turned off and the bias adjustment circuit is turned on; and the compensation stage is between the first sub-stage and the second sub-stage.

2. The display panel of claim 1, wherein the drive transistor is a P-type transistor, and a bias signal provided by the bias signal terminal in the bias adjustment stage is a high-level signal; or the drive transistor is an N-type transistor, and a bias signal provided by the bias signal terminal in the bias adjustment stage is a low-level signal.

3. The display panel of claim 1, wherein the bias adjustment circuit comprises a first transistor, a gate of the first transistor is connected to the first scan signal terminal, and the first transistor is connected between the first terminal of the drive transistor and the bias signal terminal.

4. The display panel of claim 1, wherein the compensation circuit comprises a second transistor, a gate of the second transistor is connected to the second scan signal terminal, and the second transistor is connected between the first terminal of the drive transistor and the gate of the drive transistor, wherein the drive transistor is a P-type transistor, and the second transistor is an N-type transistor.

5. The display panel of claim 1, wherein in part of a time period of the compensation stage, the bias adjustment circuit is turned on, and the bias signal terminal provides a reset signal for the first terminal of the drive transistor; and the bias adjustment circuit is turned off in remaining part of the time period of the compensation stage, wherein the drive transistor is a P-type transistor, and a bias signal provided by the bias signal terminal in the bias adjustment stage is a high-level signal, and a reset signal provided by the bias signal terminal in the compensation stage is a low-level signal; or the drive transistor is an N-type transistor, and a bias signal provided by the bias signal terminal in the bias adjustment stage is a low-level signal, and a reset signal provided by the bias signal terminal in the compensation stage is a high-level signal.

6. The display panel of claim 1, wherein the pixel circuit comprises a data write circuit, the data write circuit is connected between the second terminal of the drive transistor and a data signal terminal, and a control terminal of the data write circuit is connected to a third scan signal terminal;

the pre-stage comprises a data write stage, in the data write stage, the data write circuit is turned on, the bias adjustment circuit is turned off, and the data signal terminal provides a data signal for the drive transistor; and the data write circuit is turned off in the bias adjustment stage.

7. The display panel of claim 6, wherein the data write circuit comprises a third transistor, a gate of the third transistor is connected to the third scan signal terminal, and the third transistor is connected between the second terminal of the drive transistor and the data signal terminal, wherein the data write circuit comprises a first capacitor, and the first capacitor is connected between the gate of the drive transistor and the gate of the third transistor.

8. The display panel of claim 6, wherein in part of a time period of the compensation stage, the data write circuit is turned on to enable the pixel circuit to simultaneously execute the data write stage.

9. The display panel of claim 6, wherein the third scan signal terminal provides a third scan signal, and the first scan signal terminal provides a first scan signal; and a pulse variation frequency of the third scan signal is less than a pulse variation frequency of the first scan signal.

10. The display panel of claim 9, wherein the display panel comprises a first display region and a second display region; and a first frequency difference value is not equal to a second frequency difference value, wherein the first frequency difference value is a difference between a pulse variation frequency of the first scan signal and a pulse variation frequency of the third scan signal in the first display region, and the second frequency difference value is a difference between a pulse variation frequency of the first scan signal and a pulse variation frequency of the third scan signal in the second display region.

11. The display panel of claim 1, wherein a working process of the pixel circuit comprises a data write frame and a retention frame; and a number of turn-on times of the bias adjustment circuit in the retention frame is greater than a number of turn-on times of the bias adjustment circuit in the data write frame.

12. The display panel of claim 11, wherein the display panel comprises a first display region and a second display region; and a first turn-on difference value is not equal to a second turn-on difference value, wherein the first turn-on difference value is a difference value between the number of turn-on times of the bias adjustment circuit in the retention frame and the number of turn-on times of the bias adjustment circuit in the data write frame in the first display region, and a second turn-on difference value is a difference value between the number of turn-on times of the bias adjustment circuit in the retention frame and the number of turn-on times of the bias adjustment circuit in the data write frame in the second display region.

13. The display panel of claim 1, wherein the pixel circuit comprises an initialization circuit, the initialization circuit is connected between the light-emitting element and an initialization signal terminal, and a control terminal of the initialization circuit is connected to a fourth scan signal terminal; and the pre-stage comprises an initialization stage, the initialization circuit is turned on in the initialization stage, and the initialization signal terminal provides an initialization signal for the light-emitting element, wherein the initialization circuit comprises a fourth transistor, a gate of the fourth transistor is connected to the fourth scan signal terminal, and the fourth transistor is connected between the light-emitting element and the initialization signal terminal.

14. The display panel of claim 13, wherein the first scan signal terminal is also served as the fourth scan signal terminal.

15. The display panel of claim 1, wherein the pixel circuit comprises a first dimming circuit and a second dimming circuit;

the first dimming circuit is connected between a first power supply signal terminal and a first terminal of the drive transistor, and a control terminal of the first dimming circuit is connected to a first dimming control terminal;

the second dimming circuit is connected between a second terminal of the drive transistor and the light-emitting element, and a control terminal of the second dimming circuit is connected to a second dimming control terminal; and the first dimming circuit and the second dimming circuit are turned off in the pre-stage.

16. The display panel of claim 15, wherein, the first dimming circuit comprises a fifth transistor, a gate of the fifth transistor is connected to the first dimming control terminal, and the fifth transistor is connected between the first power supply signal terminal and the first terminal of the drive transistor; and the second dimming circuit comprises a sixth transistor, a gate of the sixth transistor is connected to the second dimming control terminal, and the sixth transistor is connected between the second terminal of the drive transistor and the light-emitting element.

17. The display panel of claim 15, wherein the first dimming control terminal is also served as the second dimming control terminal.

18. A display device comprising a display panel, wherein the display panel comprises:

a pixel circuit and a light-emitting element, wherein the pixel circuit comprises a drive circuit and a bias adjustment circuit, the drive circuit is configured to provide a drive current to the light-emitting element and comprises a drive transistor, the bias adjustment circuit is connected between a first terminal of the drive transistor and a bias signal terminal, a control terminal of the bias adjustment circuit is connected to a first scan signal terminal, and a second terminal of the drive transistor is coupled to the light-emitting element; and wherein a working process of the pixel circuit comprises a pre-stage, the pre-stage comprises a bias adjustment stage, the bias adjustment circuit is turned on in the bias adjustment stage, and the bias signal terminal provides a bias signal to the first terminal of the drive transistor, wherein the pixel circuit comprises a compensation circuit, the compensation circuit is connected between the first terminal of the drive transistor and a gate of the drive transistor, and a control terminal of the compensation circuit is connected to a second scan signal terminal;

the pre-stage comprises a compensation stage, and the compensation circuit is turned on in the compensation stage to compensate for a threshold voltage of the drive transistor; and the compensation circuit is turned off in the bias adjustment stage, wherein the bias adjustment stage comprises a first sub-stage and a second sub-stage disposed at intervals;

in the first sub-stage, the compensation circuit is turned off and the bias adjustment circuit is turned on;

in the second sub-stage, the compensation circuit is turned off and the bias adjustment circuit is turned on; and the compensation stage is between the first sub-stage and the second sub-stage.

* * * * *